(12) United States Patent
Herrera

(10) Patent No.: US 6,322,158 B1
(45) Date of Patent: Nov. 27, 2001

(54) LOCKABLE AUTOMOBILE WHEEL ASSEMBLY

(76) Inventor: Juan C. Herrera, 1403 N. Baxter St., Anaheim, CA (US) 92806

( * ) Notice: Subject to any disclaimer, the term of this patent is extended or adjusted under 35 U.S.C. 154(b) by 0 days.

(21) Appl. No.: 09/641,961

(22) Filed: Aug. 21, 2000

Related U.S. Application Data

(63) Continuation-in-part of application No. 09/185,229, filed on Nov. 3, 1998, now Pat. No. 6,116,700.

(51) Int. Cl.[7] ..................................................... B60B 23/00
(52) U.S. Cl. ....................... 301/111; 301/114; 301/35.58; 70/225; 70/386
(58) Field of Search ................................. 301/111, 105.1, 301/114, 33.55, 35.63, 35.88; 70/225, 237, 34, 386, 226

(56) References Cited

U.S. PATENT DOCUMENTS

| | | | |
|---|---|---|---|
| 2,046,779 | * | 7/1936 | Hack .................. 301/35.58 |
| 2,231,194 | * | 2/1941 | Peterson ............... 301/35.63 |
| 4,621,873 | * | 11/1986 | Weinstein et al. ............ 70/225 |
| 5,352,026 | * | 10/1994 | Snook ................. 301/105.1 |
| 5,492,391 | * | 2/1996 | Snook .................. 301/35.58 |
| 5,584,537 | * | 12/1996 | Miansian ............... 301/35.63 |
| 5,636,905 | * | 6/1997 | Pagacz ................. 301/35.58 |
| 5,820,224 | * | 10/1998 | Dimatteo, Jr. ............ 301/35.58 |
| 5,887,952 | * | 3/1999 | Gandellini ............. 301/35.63 |
| 5,934,118 | * | 8/1999 | Henness ................. 70/226 |
| 5,941,105 | * | 8/1999 | Macey .................... 70/225 |
| 6,193,320 | * | 2/2001 | Weis ................... 301/35.63 |

* cited by examiner

Primary Examiner—S. Joseph Morano
Assistant Examiner—Long Bao Nguyen
(74) Attorney, Agent, or Firm—Albert O. Cota

(57) ABSTRACT

A lockable automobile wheel assembly (10) that is utilized to safely secure an automobile wheel (70), and especially an automobile spoked wheel (70). The assembly (10) consists of two major elements: a hub adapter (12) end a hub securing member (40), which is also referred to as a hex nut or spinner. The adapter (12) includes a circular section (14) having a center bore (16) from where projects outward a center hub (28). The hub adapter (12) is designed to be inserted and attached to a central hub (74) centrally located and attached within the confines of the automobile wheel (70). Once attached, the center hub (28) protrudes through the vertical plane of the automobile wheel (70), which then allows the hub securing member (40) to be attached to the center hub (28). After the member (40) is attached the assembly (12) is secured to the automobile wheel (70).

18 Claims, 5 Drawing Sheets

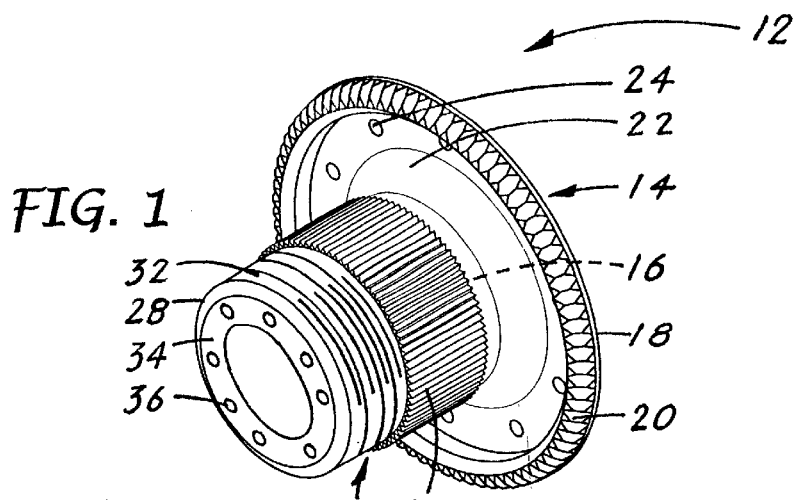
FIG. 1
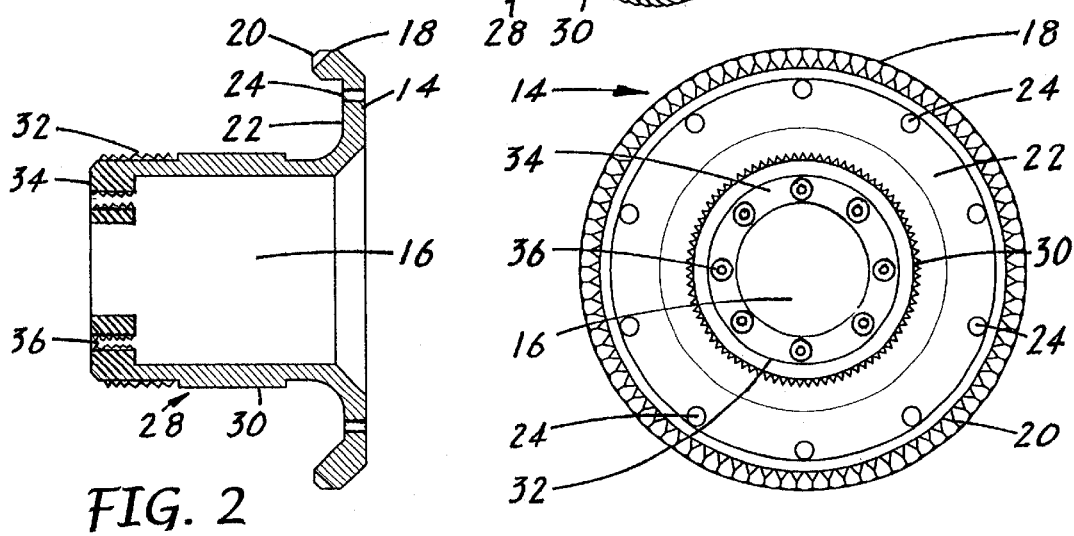
FIG. 2
FIG. 3
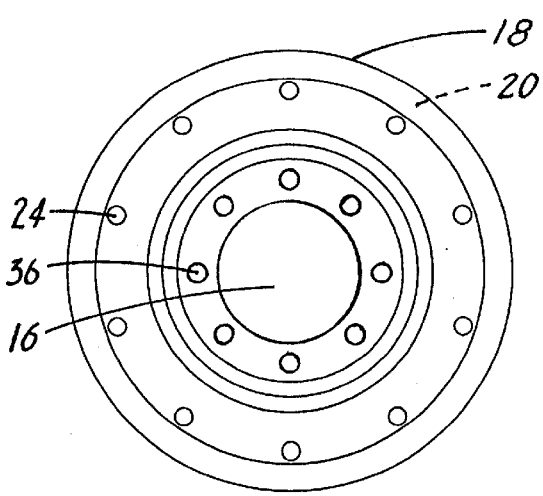
FIG. 4
FIG. 5

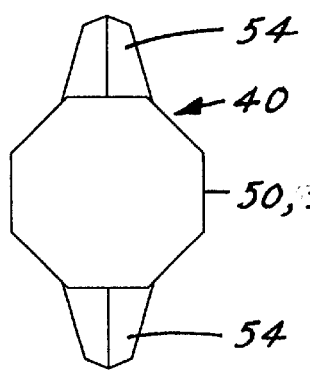
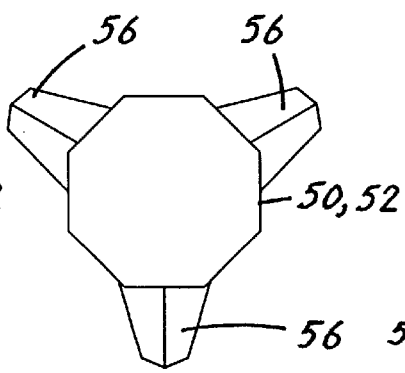
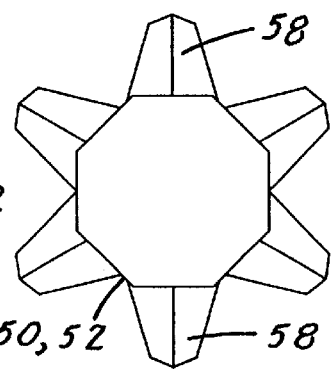
FIG. 8    FIG. 9    FIG. 10
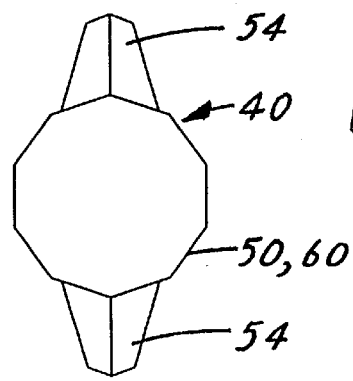
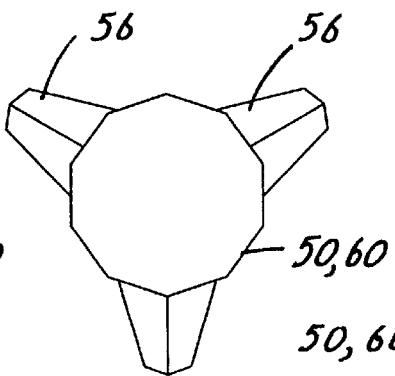
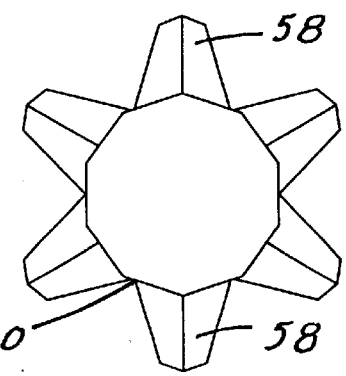
FIG. 11    FIG. 12    FIG. 13
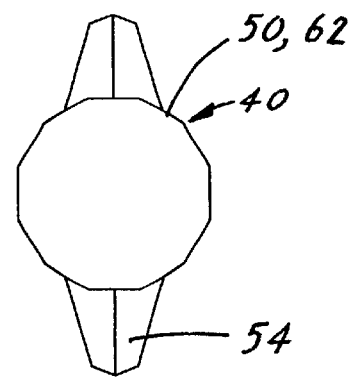
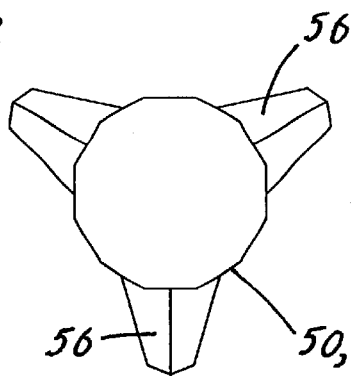
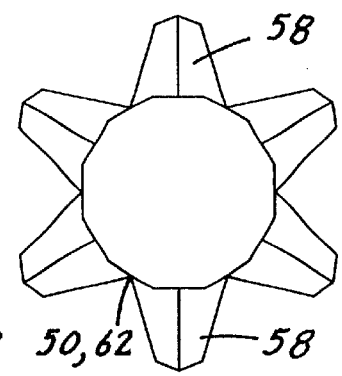
FIG. 14    FIG. 15    FIG. 16

LOCKABLE AUTOMOBILE WHEEL ASSEMBLY

This application is a continuation-in-part of now U.S. patent application Ser. No. 6,116,700 filed Nov. 3, 1998.

TECHNICAL FIELD

The invention pertains generally to lockable automobile wheels and more particularly to a lockable automobile wheel assembly that incorporates a hub adapter attached to wheel studs and a detachable hub securing spinner.

BACKGROUND ART

Previously many types of wheel attachments have been used to provide an effective means for quick wheel removal and installation along with locks to prevent theft. In most instances prior art has concentrated on locking a lug stud by replacing the stud's nut with a tamper proof lug nut that requires some type of key or other special device for removal. Others have utilized locked cover plates to protect and hide the lug nuts underneath. Unfortunately, none of these device can provide total protection from theft while remaining aesthetically pleasing.

A search of the prior art did not disclose nay patents that read directly on the claims of the instant invention, however the following U.S. patents are considered related:

| U.S PAT. NO. | INVENTOR | ISSUED |
| --- | --- | --- |
| Des.407,363 | Schardt | 30 March 1999 |
| 4,574,602 | Mitsuru | 11 March 1986 |
| 4,336,698 | Hurd | 29 June 1982 |
| 3,995,461 | Hudson | 7 December 1976 |
| 3,978,698 | Ono | 7 September 1976 |
| 3,952,563 | Yamashita | 27 April 1976 |

The U.S. Pat. No. Des. 4,574,602 patent discloses a wheel locking device where one of the lug nuts is secured to the wheel by a lockable nut which cannot be removed without the use of a key.

The U.S. Pat. No. Des. 4,336,698 patent discloses a tamper proof lug nut or bolt lock which includes a cylinder on which is rotatably mounted a sleeve with a hex for receiving a wrench and a coupling assembly disposed within the sleeve for selectively coupling and uncoupling the sleeve to the nut assembly by means of a key.

The U.S. Pat. No. Des. 3,995,461 patent discloses a wheel lock consisting of a cover plate which blocks access to the wheel bolts. The plate is attached by screws passing through the plate with the plate held in position by a lock passing therethrough.

The U.S. Pat. No. Des. 3,978,698 patent discloses a lock assembly including threads for fasting one lug on one of the plurality of wheel attaching threaded fasteners. The assembly is locked and unlocked with a key.

The U.S. Pat. No. Des. 3,952,563 patent discloses a lock assembly for coupling a wheel to a vehicle using the vehicles studs. The assembly requires a key for access.

For background purposes and as indicative of the art to which the invention relates, reference may be made to the following remaining patents found in the search:

| U.S. PAT. NO. | INYENTOR | ISSUED |
| --- | --- | --- |
| 5,941,105 | Macey | August 1999 |
| 5,934,118 | Henness | August 1999 |
| 5,887,952 | Gandellini | March 1999 |
| 5,820,224 | Dimatteo, Jr. | October 1998 |
| 5,636,905 | Pagacz | June 1997 |
| 5,584,537 | Miansian | December 1996 |
| 5,492,391 | Snook | February 1996 |
| 5,352,026 | Snook | October 1994 |
| 4,621,673 | Weinstein et al | November 1986 |
| 2,231.194 | Peterson | February 1941 |
| 2,046,779 | Hack | July 1936 |

DISCLOSURE OF THE INVENTION

The lockable automobile wheel assembly is designed to provide an aesthetic and practical method for locking a vehicle wheel to an automobile. The need for locking the wheels has become more critical as the industry has developed more costly and highly sought-after wheels. This is particularly true with the spoked wheels that are popular at the present time and create an open invitation for theft if no preventive measures, such as locking, are utilized.

The instant invention easily fulfills this locking need as an hub adapter is employed that is attached to a vehicle brake drum with conventional lug nuts. The nuts are completely covered and hidden by a separate central hub which attaches over the hub adapter, thus protecting the nuts and making them inaccessible. The automobile wheel is quickly detachable as the hub adapter interfaces with the central hub on the vehicle and is held in place by a hub securing member in the form of a hollow hex nut or spinner that mates with a hub. The nut or spinner is both threaded onto a center hub on the adapter using mating male and female threads and subsequently bolted.

In view of the above disclosure, the primary object of the invention is to provide a structure that is easily and safely utilized to secure a vehicle wheel to an automobile.

An important object of the invention is also the strength that is added into the assembly, as prior art in this type of mounting system utilizes only gear teeth cut into the corner of the outside edge of an adapter flange, and matting teeth tin the integral shoulder of the center hub. While this is the arrangement has been acceptable in the past, if the center hub becomes loose the teeth immediately disengages, thereby creating a dangerous condition with no braking control on the wheel. By utilizing a mating spline over a large surface this problem is completely eliminated; the ultimate structural integrity of the union is greatly enhanced and maximum security is realized.

Another object of the invention is in the strength of the locking mechanism, as the invention does not rely on the soundness of the lock itself but instead on a direct metal to metal interference fit.

In addition to the above object of the invention it is also an object of the invention to produce a lockable automobile wheel assembly that:

can be utilized on both spoked wheels and non-spoked wheels of various sizes, can be produced in various type of finishes, is easily installed and removed, is maintenance free, and is cost effective from both a manufacturer's and consumer's point of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a perspective view of a hub adapter which comprises an element of the lockable automobile FIG. 2 is a side sectional view of the hub adapter.

FIG. 3 is a front elevational view of the hub adapter.

FIG. 4 is a rear elevational view of the hub adapter.

FIG. 5 is a side elevational view of the hub adapter.

FIG. 8 is a front elevational view of a hub securing member having eight sides and a pair of spaced arms.

FIG. 9 is a front elevational view of a hub securing member having eight sides and three equally FIG. 10 is a front elevational view of a hub securing member having eight sides and six equally spaced arms.

FIG. 11 is a front elevational view of a hub securing member having ten sides and a pair of opposed arms.

FIG. 12 is a front elevational view of a hub securing member having ten sides and three squally spaced arms.

FIG. 13 is a front elevational view of a hub securing member having ten sides and six equally spaced FIG. 14 is a front elevational view of a hub securing member having twelve sides and a pair of opposed arms.

FIG. 15 is a front elevational view of a hub securing member having twelve sides and three equally spaced arms.

FIG. 16 is a front elevational view of a hub securing member having twelve sides and six equally spaced arms.

BEST MODE FOR CARRYING OUT THE INVENTION

Figure 21:
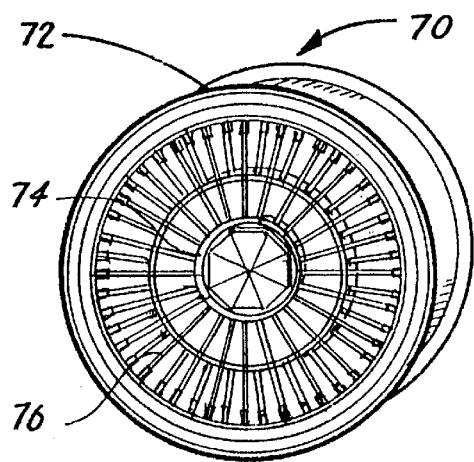
FIG. 21 is a perspective view of a typical automobile 12 wire wheel to which is attached the lockable automobile wheel assembly.

The best mode for carrying out the invention is presented in terms of a preferred embodiment for a lockable automobile wheel assembly 10 which allows a vehicle wheel, and especially a wire wheel, to be secured. The preferred embodiment, as shown in FIG. 1–20 is comprised of two major elements: a hub adapter 12 and a hub securing member 40. The two inventive elements function in combination with an automobile wheel 70, as shown in FIG. 21, that is comprised of an outer rim 72, a central hub 74 and a plurality of spokes 76 which are connected between the outer rim and the central hub 74.

The hub adapter 12, as shown in FIGS. 1–5, is comprised of a circular section 14 and a center hub 28. The circular section 14 has a center bore 16, as best shown in FIG. 2, and a perimeter edge 18 from where extends outward, as shown in FIGS. 2 and 5, a geared flange 20. Below the geared flange 20, as best shown in FIG. 2, is a substantially flat area 22 which has a plurality of brake drum attachment bore 24 which allow the hub adapter 12 to be secured to a vehicle brake drum by the use of bolts. The geared flange 20 is dimensioned to interface with a set of internal gear teeth located on the central hub 74 of the automobile wheel 70.

The center hub 28 as shown in FIGS. 1, 2 and 5, extends outward from the center bore 16 and is preferably integral with the circular section, as shown in FIG. 2 extending outward from near the flat area 22 is a multiplicity of external, radially-extending splines 30. From the outer edge of the spline 30 commences a set of external radial threads 32, and from the outer end of the threads 32 is located a terminus ring 34. Around the terminus ring 34, as best shown in FIGS. 1 and 2, is a plurality of threaded hub bores 36. The radial splines are dimensioned to interface with a set of internal radial splints located on the central hub 74 of the automobile wheel 70. Likewise, the external radial threads 32 are dimensioned to receive and attach the hub Securing member 40 as described infra. The hub adapter 12 is preferably machined from a ductile iron casting and chrome plated.

The second major element of the assembly 10 is the hub securing member 40, which is also referred to as a hex nut or spinner. As shown in FIGS. 6–20, the member 40 consists of an outer gripping surface 42, a rear cavity 44 and a plurality of recessed hub bores 48.

The outer gripping surface 42, as shown in FIGS. 6–20, is configured to receive a manual or a power operated tool to produce tightening or loosening torque. The rear cavity 44, as shown in FIG. 7, has on its perimeter a set of internal radial threads 46 that are dimensioned to interface and attach to the external radial threads 32 on the center hub 28. The plurality of recessed hub bores 48 are dimensioned and spaced to be in alignment with the threaded hub bores 36 on the center hub 28. Thus, when the hub securing member 40 is threaded into the external radial threads 32 on the center hub 28, and a bolt is inserted into the recessed hub bores 48 and threaded into the threaded hub bores 36 on the center hub, the hub securing member 40 is secured.

Figure 6:
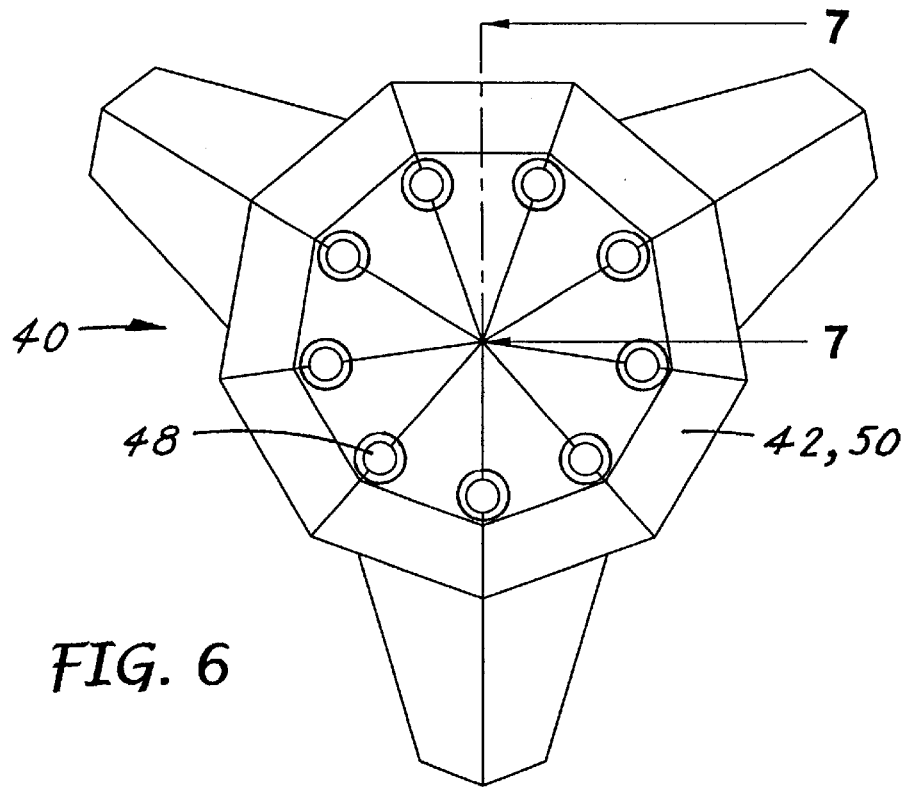
FIG. 6 is a front elevational view of a hub securing member which comprises an element of the lockable automobile wheel assembly.
Figure 7:
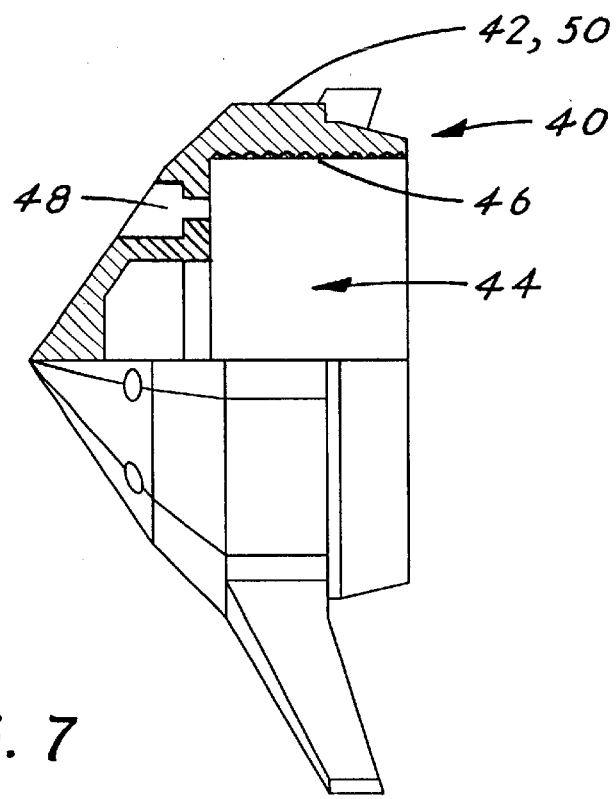
FIG. 7 is a partial side elevational view and a partial sectional view of the hub securing member.

The preferred configuration of the hub securing member 40, as shown in FIG. 6, has an outer gripping surface consisting of nine faceted sides and three evenly spaced arms that extend outward from the gripping surface 42. However, several other configuration of the hub securing member 40 can also be utilized, as shown in FIGS. 8–20.

In FIG. 8 is shown a hub securing member 40 having an outer gripping surface 42 consisting of a raised faceted surface 50 having eight rides 52 and a pair of opposed arms 54. In FIG. 9 is shown an eight sided faceted surface 52 having three evenly spaced arms 56. In FIG. 10 is also an eight sided faceted surface 52 having six evenly spaced arms 58. In FIGS. 11, 12 and 13 is shown a raised faceted surface 50 consisting of ten sides 60 having two evenly spaced arms 54, three evenly spaced arms 56, and six evenly spaced arms 53 respectively. Likewise, in FIGS. 14, 15 and 16 is shown a raised faceted surface 50 having twelve sides 62. In FIG. 14 the raised faceted surface has two evenly spaced arms 58, in FIG. 15 the raised faceted surface 50 has three evenly spaced arms 56 and in FIG. 16 the raised faceted surface 50 has six evenly spaced arms 58.

Figure 17:
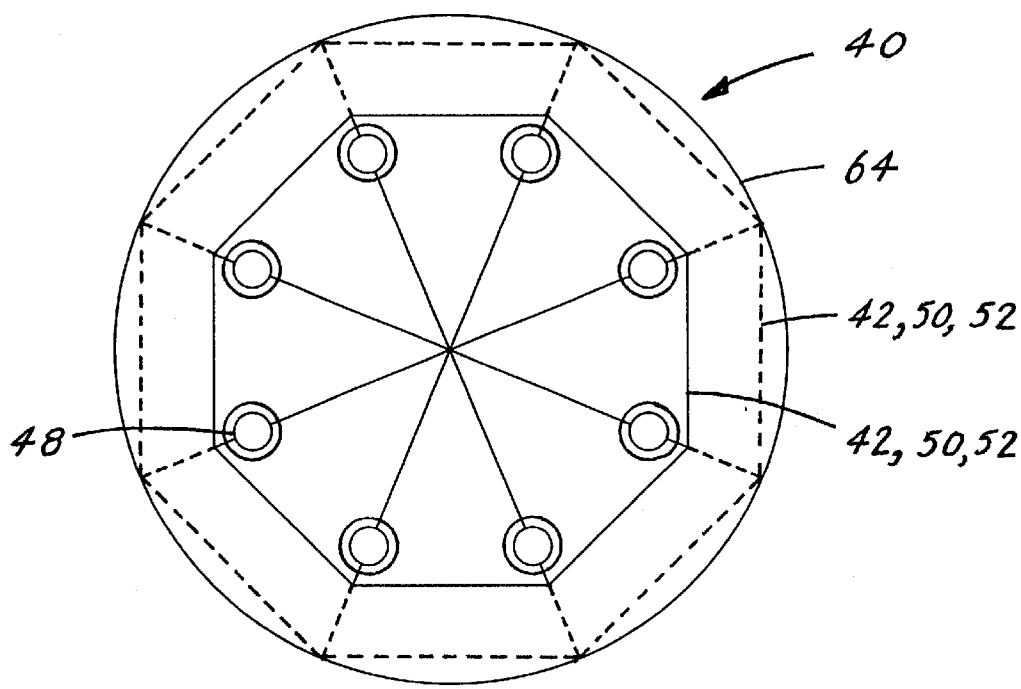
FIG. 17 is a front elevational view of a second design for a hub securing member shown with eight faceted sides, wherein the sides can be located as shown by the solid lines or as shown by the broken lines.
Figure 18:
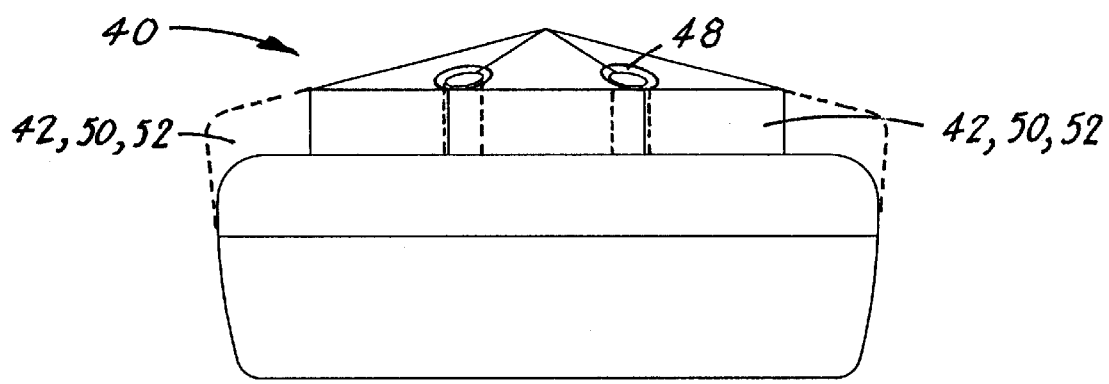
FIG. 18 is a side elevational view of the hub securing member shown in FIG. 17.

In FIGS. 17 and 18 is shown a modified hub securing member 40 having a circular perimeter 64 and an outer gripping surface 42 having a raised faceted surface 50 consisting of eight sides 52. However, in this design, 3–12 sides can also be utilized. It should be noted that the faceted sides can be located inward as shown by the solid lines, or near the circular perimeter as shown by the broken lines.

Figure 19:
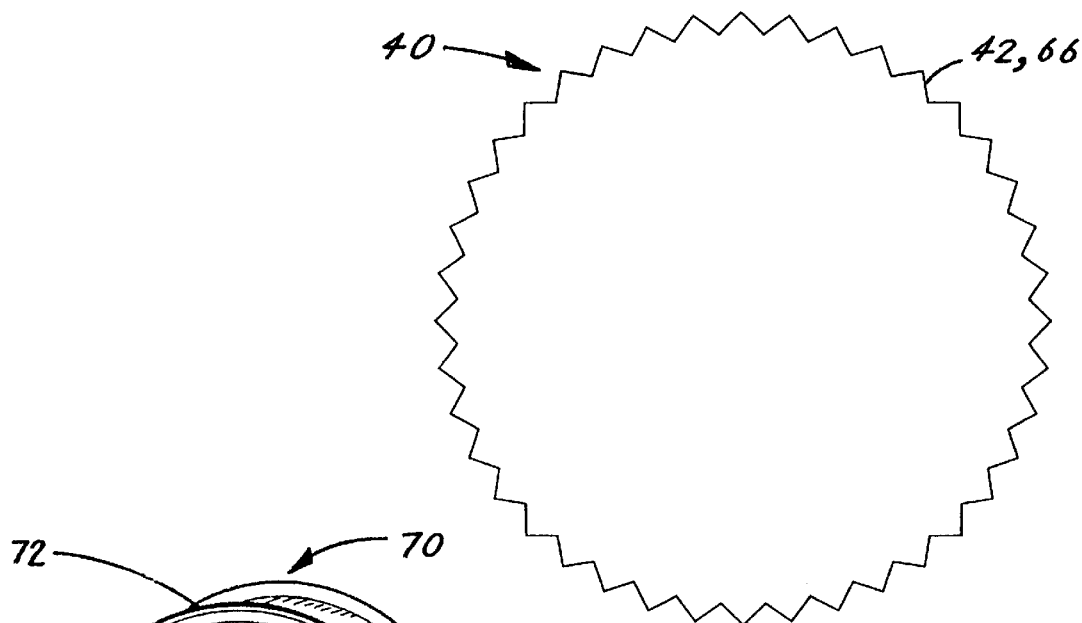
FIG. 19 is a front elevational view of a third design for a hub receiving member.
Figure 20:
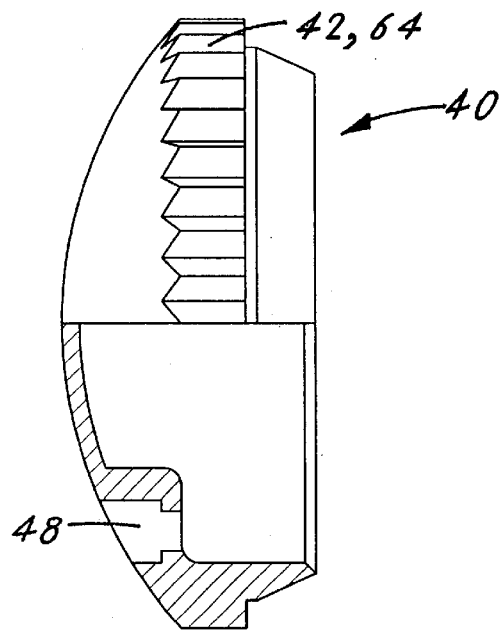
FIG. 20 is a partial side elevational view and a partial sectional view of the hub receiving member shown in FIG. 19.

In FIGS. 19 and 20 is shown yet another modified design for the hub securing member 40 which has an outer gripping surface 42 consisting of a circular perimeter 64. Around this perimeter is a multiplicity of gear-like protrusions 66 which add to the aesthetics of the member 40 and allow the member 40 to be attached and removed.

While the invention has been described in complete detail and pictorially shown in the accompanying drawings it is not to be limited to such details, since many changes and modifications may be made to the invention without departing from the spirit and the scope thereof. Hence, it is described to cover any and all modification and forms which may come within the language and scope of the claims.

What is claimed is:

1. A lockable automobile wheel assembly which functions in combination with an automobile wheel comprising an outer rim, a central hub and a plurality of spokes connected between the outer rim and the central hub, said assembly comprising:
   a) a hub adapter having:
      (1) a circular section having a center bore and a perimeter edge from where extends outward a geared flange wherein below the geared flange is a substantially flat area having a plurality of brake drum attachment bores,
      (2) a center hub extending outward from the center bore, said center hub having a multiplicity of 2 external radial extending splines, a set of external radial threads located outward from said splines, and a terminus ring having a plurality of threaded hub bores, and
   b) a hub securing member having means for being attached to and removed from the center hub of said hub adapter.

2. The assembly as specified in claim 1 wherein said center hub is integral with said circular section.

3. The assembly as specified in claim 1 wherein the geared flange is dimensioned to interface with a set of internal gear teeth located on the central hub of said automobile wheel.

4. The assembly as specified in claim 1 wherein the external radial splines on said center hub are dimensioned to interface with a set of internal radial splines located on the central hub of said automobile wheel.

5. The assembly as specified in claim 1 wherein said hub securing member comprises:
   a) an outer gripping surface configured to receive a manual or power operated tool,
   b) a rear cavity having a set of internal radial threads dimensioned to interface with the external radial threads on said center hub, and
   c) a plurality of recessed hub bores dimensioned and spaced in alignment with the threaded hub bores on said center hub, wherein when a bolt is inserted into the recessed hub bores and threaded into the threaded hub bores on 1 said center hub, said hub securing member is secured.

6. The assembly as specified in claim 5 wherein said outer gripping surface comprises a faceted surface having eight sides.

7. The assembly as specified in claim 6 wherein said center hub further comprises a pair of opposed arms that extend outward from said gripping surface.

8. The assembly as specified in claim 6 wherein said center hub further comprises three evenly spaced arms that extend outward from said gripping surface.

9. The assembly as specified in claim 6 wherein said center hub further comprises six evenly spaced arms that extend outward from said gripping surface.

10. The assembly as specified in claim 5 wherein said outer gripping surface comprises a raised faceted surface having ten sides.

11. The assembly as specified in claim 10 wherein said center hub further comprises a pair of opposed arms that extend outward from said gripping surface.

12. The assembly as specified in claim 10 wherein said center hub further comprises three evenly spaced arms that extend outward from said gripping surface.

13. The assembly as specified in claim 10 wherein said center hub further comprises six evenly spaced arms that extend outward from said gripping surface.

14. The assembly as specified in claim 5 wherein said outer gripping surface comprises a faceted surface having twelve sides.

15. The assembly as specified in claim 14 wherein said center hub further comprises a pair of opposed arms that extend outward from said gripping surface.

16. The assembly as specified in claim 14 wherein said center hub further comprises three evenly spaced arms that extend outward from said gripping surface.

17. The assembly as specified in claim 14 wherein said center hub further comprises six evenly spaced arms that extend outward from said gripping surface.

18. The assembly as specified in claims 5 wherein said outer gripping surface comprises a multiplicity of gear-like protrusions that extend around a circular perimeter of said outer gripping surface.

\* \* \* \* \*